United States Patent
You et al.

(10) Patent No.: US 12,168,714 B2
(45) Date of Patent: Dec. 17, 2024

(54) ALL-DONOR BLACK ELECTROCHROMIC POLYMER AND METHOD FOR PREPARING SAME

(71) Applicant: AMBILIGHT INC., Milpitas, CA (US)

(72) Inventors: Liyan You, West Lafayette, IN (US); Jianguo Mei, West Lafayette, IN (US)

(73) Assignee: AMBILIGHT INC., Milpitas, CA (US)

( * ) Notice: Subject to any disclaimer, the term of this patent is extended or adjusted under 35 U.S.C. 154(b) by 784 days.

(21) Appl. No.: 17/359,175

(22) Filed: Jun. 25, 2021

(65) Prior Publication Data
US 2022/0017689 A1 Jan. 20, 2022

Related U.S. Application Data

(60) Provisional application No. 63/052,487, filed on Jul. 16, 2020.

(51) Int. Cl.
- *C08G 61/12* (2006.01)
- *C09K 9/02* (2006.01)

(52) U.S. Cl.
CPC .............. *C08G 61/126* (2013.01); *C09K 9/02* (2013.01)

(58) Field of Classification Search
CPC .................................................. C08G 61/126
See application file for complete search history.

(56) References Cited

U.S. PATENT DOCUMENTS

| | | |
|---|---|---|
| 4,256,380 A | 3/1981 | Barclay et al. |
| 2011/0017956 A1 | 1/2011 | Hou et al. |
| 2019/0016852 A1 | 1/2019 | Mei et al. |

FOREIGN PATENT DOCUMENTS

| | | |
|---|---|---|
| CN | 107674185 A | 2/2018 |
| CN | 107880253 A | 4/2018 |
| CN | 110892001 A | 3/2020 |

OTHER PUBLICATIONS

Dylan T. Christiansen and John R. Reynolds, A Fruitful Usage of a Dialkylthiophene Comonomer for Redox Stable Wide-Gap Cathodically Coloring Electrochromic Polymers, Macromolecules 2018, 51, 9250-9258. (Year: 2018).*

Justin A. Kerszulis, Rayford H. Bulloch, Natasha B. Teran, Rylan M. W. Wolfe, and John R. Reynolds, Relax: A Sterically Relaxed Donor-Acceptor Approach for Color Tuning in Broadly Absorbing, High Contrast Electrochromic Polymers, Macromolecules 2016, 49, 6350-6359. (Year: 2016).*

Anna M. Osterholm, D. Eric Shen, Justin A. Kerszulis, Rayford H. Bulloch, Michael Kuepfert, Aubrey L. Dyer, and John R. Reynolds Four Shades of Brown: Tuning of Electrochromic Polymer Blends Toward High-Contrast Eyewear, ACS Appl. Mater. Interfaces 2015, 7, 1413-1421 (Year: 2015).*

Hui Zhang, Shouli Ming, Yuzhang Liang, Lei Feng, Ting Xu, A Multi-color Electrochromic Material based on Organic Polymer, Int. J. Electrochem. Sci., 15 (2020) 1044-1057, (Year: 2020).*

(Continued)

*Primary Examiner* — Bijan Ahvazi

(57) ABSTRACT

An all-donor black color electrochromic polymer is disclosed as well as a method for preparing the all-donor black color electrochromic polymer. The electrochromic polymer comprises conjugated polymers, and the conjugated polymers are chemically linked, or physically blended, or both.

6 Claims, 6 Drawing Sheets

(56) References Cited

OTHER PUBLICATIONS

Christiansen et al., "A Fruitful Usage of a Dialkylthiophene Comonomer for Redox Stable Wide-Gap Cathodically Coloring Electrochromic Polymers", Macromolecules, Nov. 9, 2018, 51, pp. 9250-9258.
Österholm et al., "Four Shades of Brown: Tuning of Electrochromic Polymer Blends Toward High-Contrast Eyewear", American Chemical Society Applied Materials & Interfaces, Jan. 9, 2015, 7, pp. 1413-1421.

* cited by examiner

ALL-DONOR BLACK ELECTROCHROMIC POLYMER AND METHOD FOR PREPARING SAME

CROSS REFERENCE TO RELATED APPLICATIONS

This application claims priority to and benefits of Provisional Application No. 63/052,487, filed on Jul. 16, 2020, the content of which is incorporated herein by reference in its entirety.

TECHNICAL FIELD

The present disclosure is generally related to an all-donor black color electrochromic polymer and method for preparing the polymers, and more particularly, is directed to an electrochromic polymer with solely electron-donor groups that presents black color at colored state, and a method for preparing same.

BACKGROUND

Electrochromic polymers can change or adjust the light intensity. Potential applications for electrochromic polymers can be found in various types of devices, such as e-paper, smart windows, and anti-glare rearview mirrors. Up to now, a lot of electrochromic polymers have been developed with different colors and structures. However, making high-performance black electrochromic polymers still remains a challenge. Most of the black electrochromic polymers reported are polymerization of donor-acceptor systems. Due to the incorporation of electron-accepting moieties in the polymer backbone, the conventional black polymer suffers from drawbacks, such as high oxidation potentials caused by the acceptor units, low contrast, and limit thermal and photostability. To design and prepare a high-performance black electrochromic polymer is still highly desired.

SUMMARY

The present disclosure is related to an electrochromic polymer comprising at least two conjugated polymers. The electrochromic polymer and the conjugated polymers consist of electron donor groups, and the electrochromic polymer shows black color at colored state.

The disclosed electrochromic polymer is produced by the conjugated polymers chemically linked, or physically blended, or both.

In some embodiments, the disclosed electrochromic polymer comprises a formula of

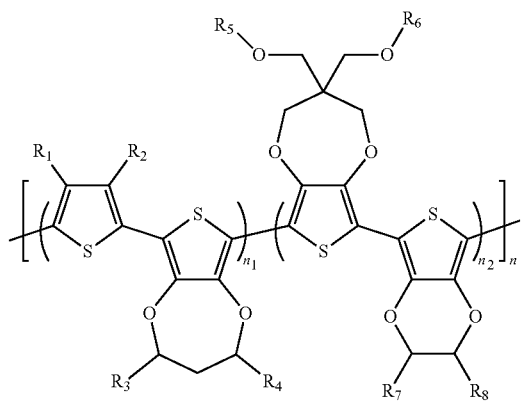

In the formula, each of $R_1$-$R_8$ is independently selected from a group including, but not limited to, hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, or $C_3$-$C_{30}$ heteroarylalkyl. n, $n_1$, and $n_2$ are integers greater than 0.

In some embodiments, the disclosed electrochromic polymer comprises a formula of

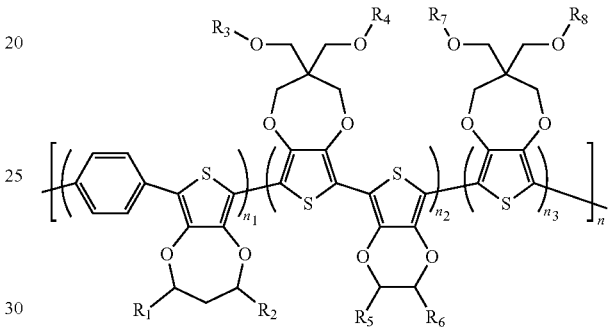

In the formula, each of $R_1$-$R_8$ is independently selected from a group including, but not limited to, hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, or $C_3$-$C_{30}$ heteroarylalkyl. n, $n_1$, $n_2$, and $n_3$ are integers greater than 0.

The present disclosure is also related to a method to prepare the disclosed electrochromic polymer. The method comprises: preparing each of the conjugated polymers such that each of the conjugated polymers is end capped with reactive functional groups by using at least one reaction monomer; and mixing the conjugated polymers together to form the disclosed electrochromic polymer.

The present disclosure is also related to a method for preparing an electrochromic polymer with combined colors or physical properties. The method comprises: preparing each of conjugated polymers such that each of the conjugated polymers is end capped with reactive functional groups by using at least one reaction monomer; and mixing the conjugated polymers together to form the polymer such that at least a portion of the conjugated polymers are chemically linked.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings below. For the purpose of illustrating the invention, the drawings show aspects of one or more embodiments of the invention. However, it should be understood that the present invention is not limited to the precise arrangements and instrumentalities shown in the drawings.

FIG. 2(A) is the image of the disclosed electrochromic polymer dissolved in chloroform. FIG. 2(B) is the image of the thin film made by the disclosed electrochromic polymer.

DETAILED DESCRIPTION OF EMBODIMENTS

Figures 1A, 1B:
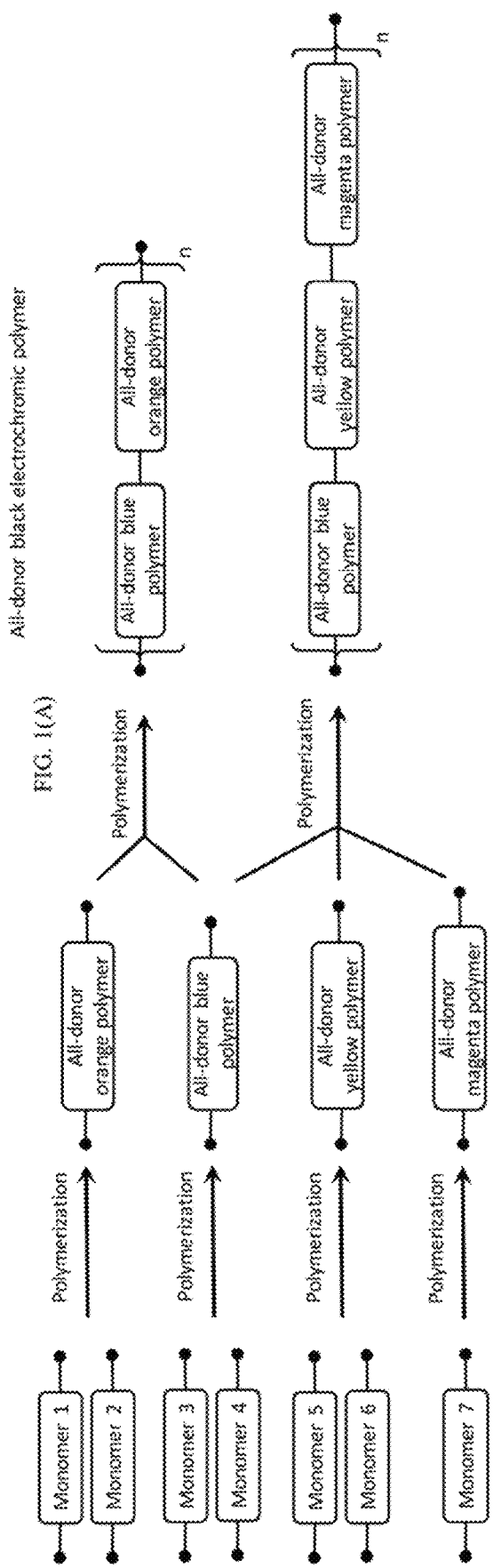
FIGS. 1(A) and 1(B) show exemplary preparation schemes to make all-donor black electrochromic polymer(s), according to some embodiments. n is an integer greater than 0.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it was individually recited herein. Additionally, the singular forms "a" "an", and "the" include plural referents unless the context clearly dictates otherwise.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment, but maybe in some instances. Furthermore, the particular features, structures, or characteristics may be combined in any suitable manner in one or more embodiments.

The present invention is related to an electrochromic polymer consisting of electron-donor groups and presenting black color at colored state, and a method to prepare the same all-donor black electrochromic polymer, as well as a method to prepare an electrochromic polymer with combined colors or physical properties.

The disclosed electrochromic polymer comprises at least two conjugated polymers. The electrochromic polymer and the conjugated polymers consist of electron donor groups, and the electrochromic polymer shows black color at colored state. And the disclosed electrochromic polymer may be produced by the conjugated polymers chemically linked, or physically blended, or both.

By this new all-donor structure design, the disclosed electrochromic polymer overcomes the drawbacks of the conventional black polymers due to the introduction of electron-accepting moieties, such as higher oxidation potentials and bad optical and mechanical stability of the electrochromic polymer. Besides that, by this new all-donor structure design, polymerizations of monomers consisting of electron donor groups are more potent to happen and endows higher production yields.

The disclosed electrochromic polymer comprises at least two conjugated polymers. Since the absorption spectrum of the all conjugated polymers for the electrochromic polymer covers the entire visible light region, black color can be obtained. In some embodiments, the disclosed electrochromic polymer comprises two conjugated polymers with one polymer presenting blue color and the other polymer presenting orange color. In some embodiments, the disclosed electrochromic polymer comprises three conjugated polymers with one polymer presenting blue color, one polymer presenting yellow color and the other one presenting red/magenta color. In some embodiments, at least one polymer present the same or similar colors. To have an enough length to present a color, each of the conjugated polymers includes at least five units.

To form the disclosed electrochromic polymer, the conjugated polymers are either chemically linked with each other, or physically blended together, or both. In some embodiments, the conjugated polymers are chemically linked by conjugated bonds. In some embodiments, the conjugated polymers are physically blended. In some embodiments, the conjugated polymers are presented in both forms, i.e., chemically linked by conjugated bonds and physically blended.

In some embodiments, the disclosed electrochromic polymer comprises two conjugated polymers, which are chemically linked by conjugated bonds. The two conjugated polymers present respectively blue and orange colors at colored state. The disclosed electrochromic polymer comprises a formula of

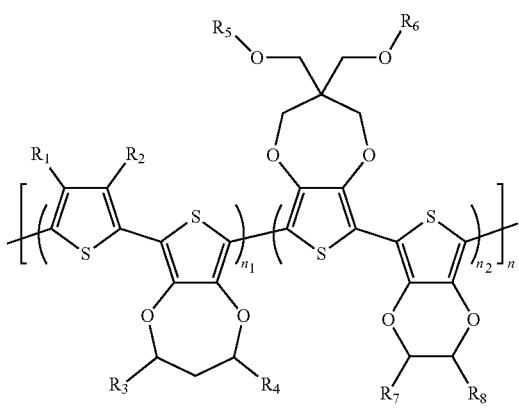

where each of $R_1$-$R_8$ is independently selected from a group including, but not limited to, hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, or $C_3$-$C_{30}$ heteroarylalkyl. n, $n_1$ and $n_2$ are integers greater than 0.

In some embodiments, the disclosed electrochromic polymer comprises three conjugated polymers, which are chemically linked by conjugated bonds. The three conjugated polymers respectively present blue, yellow, and magenta colors, which are complementary at colored state. The disclosed electrochromic polymer comprises a formula of

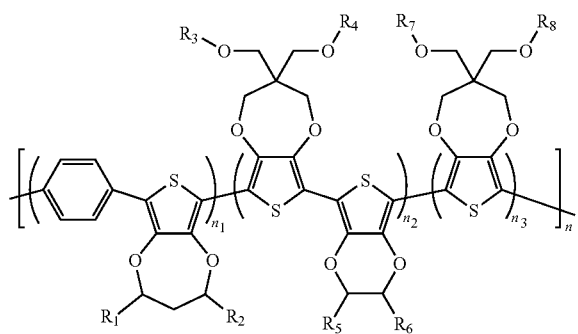

where each of $R_1$-$R_8$ is independently selected from a group including, but not limited to, hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, or $C_3$-$C_{30}$ heteroarylalkyl. n, $n_1$ $n_2$, and $n_3$ are integers greater than 0.

In another aspect, the present disclosure is also related to a method to prepare the disclosed electrochromic polymer. The method comprises: preparing each conjugated polymer with one or more types of monomers; and then mixing the conjugated polymers together to form the electrochromic polymer. In some embodiments, when preparing each of the conjugated polymers, one type of monomer is provided in excess amount of another, different type of monomer to promote formation of a short chain of a polymer or oligomer. In some embodiments, when mixing the conjugated polymers, a polymerization reaction happens to link all the conjugated polymers chemically. In some embodiments, when mixing the conjugated polymers, the conjugated polymers are physically blended. In some embodiments, when mixing the conjugated polymers, some conjugated polymers are chemically linked and other conjugated polymers are physically blended.

FIGS. 1(A) and 1(B) show two exemplary preparation schemes to make the disclosed electrochromic polymer. With reference to FIG. 1(A), the first exemplary scheme is to make the disclosed all-donor black electrochromic polymer with all-donor blue conjugated polymer and all-donor orange conjugated polymer chemically linked. First, electron-rich monomers (e.g., Monomer 1-4) are polymerized irrespectively into all-donor blue conjugated polymer and all-donor orange conjugated polymer, and both polymers are end-capped with active functional groups. Then, reacting all-donor blue conjugated polymer with all-donor orange conjugated polymer together to form the disclosed all-donor black electrochromic polymer. With reference to FIG. 1(B), the second exemplary scheme is to make the disclosed all-donor black electrochromic polymer with all-donor blue conjugated polymer, all-donor yellow conjugated polymer, and all-donor magenta conjugated polymer chemically linked. First, electron-rich monomers (e.g., Monomer 3-7) are polymerized irrespectively into all-donor blue conjugated polymer, all-donor yellow conjugated polymer, and all-donor magenta conjugated polymer end-capped with active functional groups. Then, reacting all-donor blue conjugated polymer with all-donor yellow conjugated polymer and all-donor magenta conjugated polymer together to form the disclosed all-donor black electrochromic polymer.

The reactive functional groups on both ends of the conjugated polymer can be any functional groups that can form chemical bonds between two conjugated polymers, for example, Cl, Br, I, H, OTf, B(OH)$_2$, Sn(Me)$_3$, Sn(Bu)$_3$, Sn($^t$Bu)$_3$, Bpin, MgBr, MgCl, etc. The reactions to form each conjugated polymer and the disclosed electrochromic polymer can be any polymerization reaction.

The length of the conjugated polymer is controlled to be greater than 5 units, so that it can show a specific color sufficiently. In some embodiments, in order to promote the reaction efficiency between the conjugated polymers, the length of the resulting conjugated polymer is controlled to be not too long by adjusting the ratio between the reaction monomers. Excess amount of one reaction monomer is used to limit the length of the resulting conjugated polymers. In some embodiments, the conjugated polymers are controlled to have a length of 10, 12, 15, or 20 units. In some embodiments, even the polymer length is higher than 20, the reaction between polymers is sufficient. The successful polymerization is indicated by the changes in solubility and solidification. In some embodiments, $CH_3OH$ precipitation is used to purify the disclosed electrochromic polymer. After purification, the color of mother liquid for polymerization of the disclosed electrochromic polymer is lighter than that of the conjugated polymers, which indicates the decreased solubility. Furthermore, some of the obtained polymer solid after polymerization between conjugated polymers change from semisolid state to solid state, which indicates the increased molecular weight. These indicate the successfully polymerization reaction. In some embodiments, the majority of the conjugated polymers are chemically linked and polymerized into the disclosed electrochromic polymer, while a limited amount of conjugated polymers might be left in the final polymer product in the form of physical blending. For example, less than 20%, 10%, 5%, 3%, or 1% of the conjugated polymers are physically blended.

In some embodiments, the disclosed electrochromic polymer is prepared by two conjugated polymers with blue and orange colors respectively. The method to prepare the disclosed electrochromic polymer comprises the following steps 1, 2, and 3:

Step 1: make an all-donor orange polymer end-capped with two active functional groups.

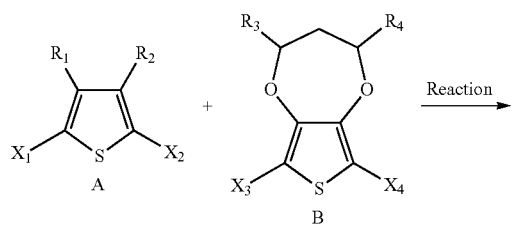

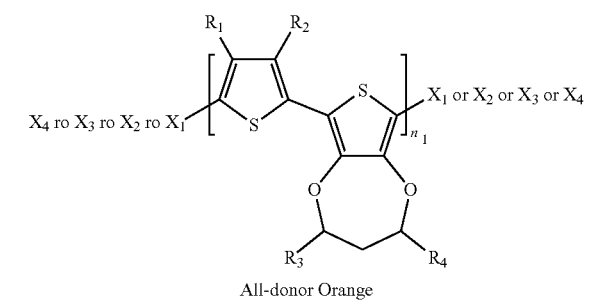

Scheme 1. General scheme to make the disclosed all-donor orange polymer.

Step 2: make an all-donor blue polymer end-capped with two active functional groups.

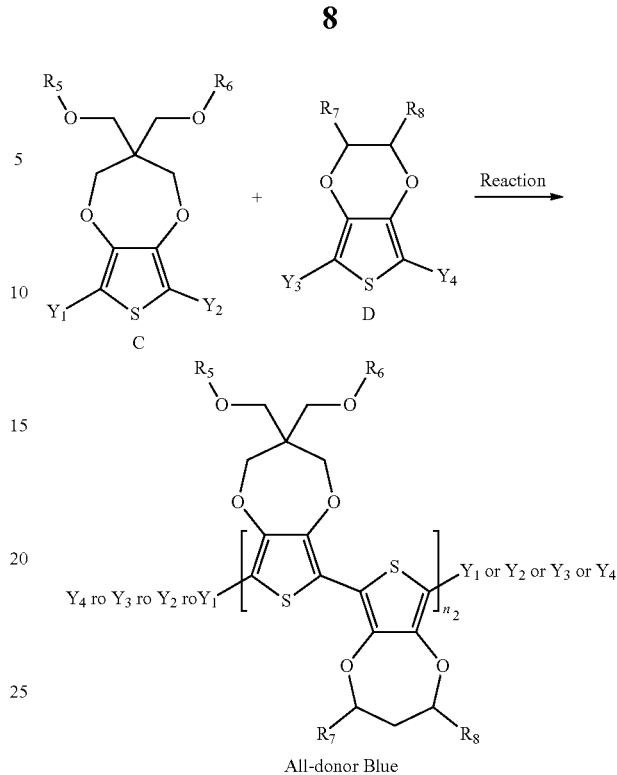

Scheme 2. General scheme to make the disclosed all-donor blue polymer.

Step 3: make the disclosed all-donor black electrochromic polymer.

Scheme 3. General scheme to make the disclosed all-donor black polymer from all-donor orange polymer and all-donor blue polymer.

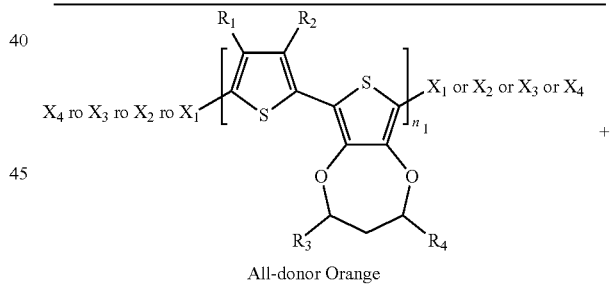

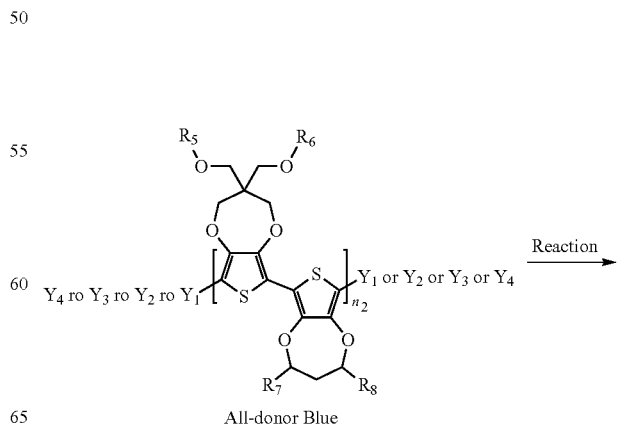

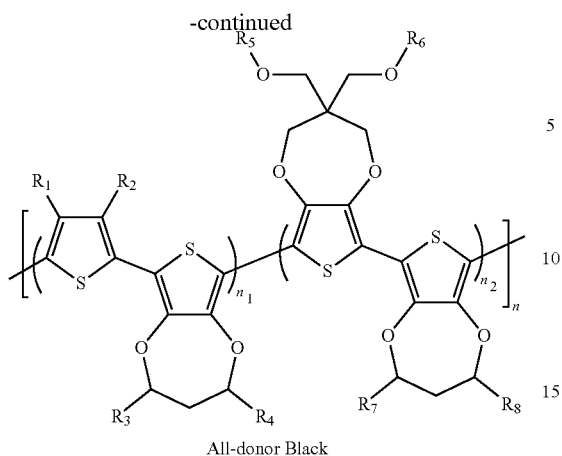

All-donor Black $X_1$-$X_4$, and $Y_1$-$Y_4$ are any functional group which can form polymerization bond at their positions, such as $C_1$, Br, I, H, OTf, $B(OH)_2$, $Sn(Me)_3$, $Sn(Bu)_3$, $Sn(^tBu)_3$, Bpin, MgBr, MgCl, etc. Each of $R_1$-$R_8$ is independently selected from a group including, but not limited to, hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclyl alkyl, $C_1$-$C_{13}$ heteroaryl, or $C_3$-$C_{30}$ heteroarylalkyl. n, $n_1$, and $n_2$ are integers greater than 0.

The disclosed all-donor black polymer is obtained by reacting the all-donor orange polymer with all-donor blue polymer. All-donor orange polymer is formed by reacting monomer A and monomer B in a ratio via a polymerization reaction. The molar ratio of two monomers ranges from 0.5 to 2. All-donor blue polymer is formed by reacting monomer C and monomer D in a ratio via any polymerization reaction. The molar ratio of two monomers ranges from 0.5 to 2. To control the length of resulting all-donor orange polymer and all-donor blue polymer, one reaction monomer is excess than the other one.

The polymerization reactions for those three steps comprises any polymerization reaction. In the following embodiments, H and Br are used as example functional groups and Direct Arylation Polymerization (DArP) between H and Br are used as example reaction.

Embodiments

In one embodiment, the disclosed electrochromic polymer comprises two conjugated polymers, which are chemically linked by conjugated bonds. The two conjugated polymers show blue and orange colors, which are complementary at colored state. The disclosed electrochromic polymer comprises a formula of

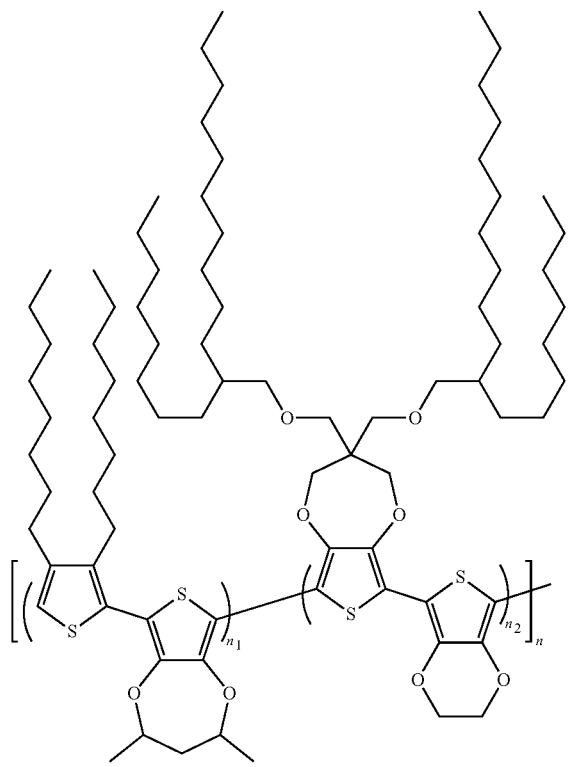

where n, $n_1$ and $n_2$ are integers greater than 0.

Figure 2A:
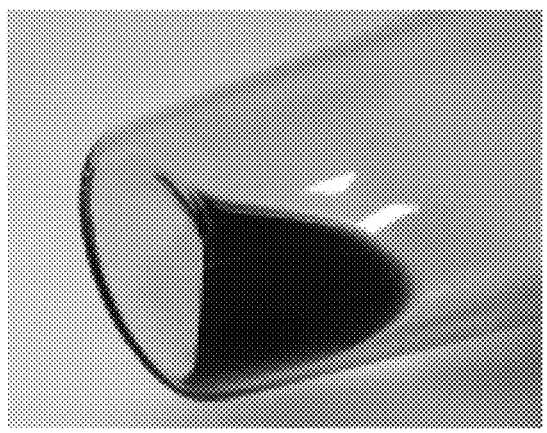
FIGS. 2(A) and 2(B) shows the images of an example all-donor black electrochromic polymer, according to one exemplary embodiment.
Figure 2B:
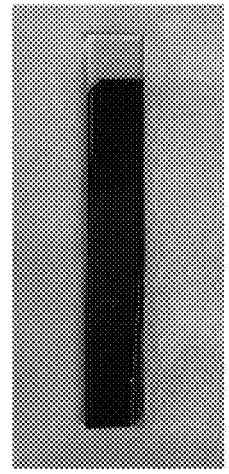
Figure 3:
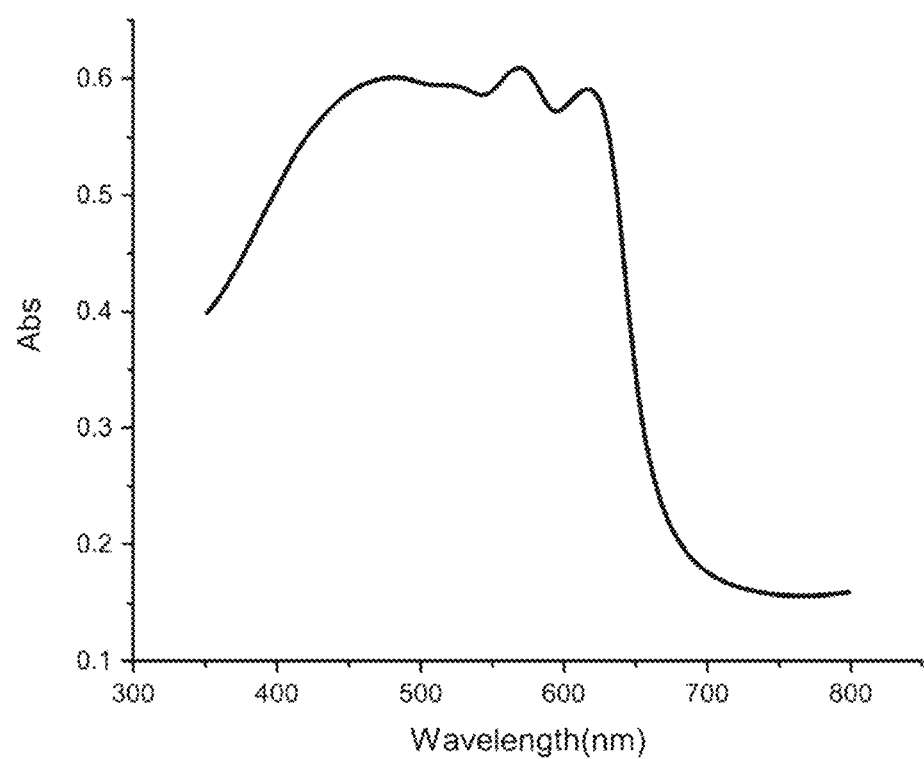
FIG. 3 shows the UV-Vis absorption spectrum of an example all-donor black electrochromic polymer dissolved in chloroform, according to one exemplary embodiment.

The example electrochromic polymer shows black color in both solution and thin film states. FIG. 2(A) shows the disclosed electrochromic polymer appears black color when dissolved in chloroform. FIG. 2(B) shows the pristine thin film of the disclosed electrochromic polymer that appears black. The black color is further confirmed by the board UV-Vis absorption (350 nm-700 nm) of the polymer solution, as shown in FIG. 3. The absorption of example electrochromic polymer covers a board wavelength, indicating a black color appearance.

Figure 4:
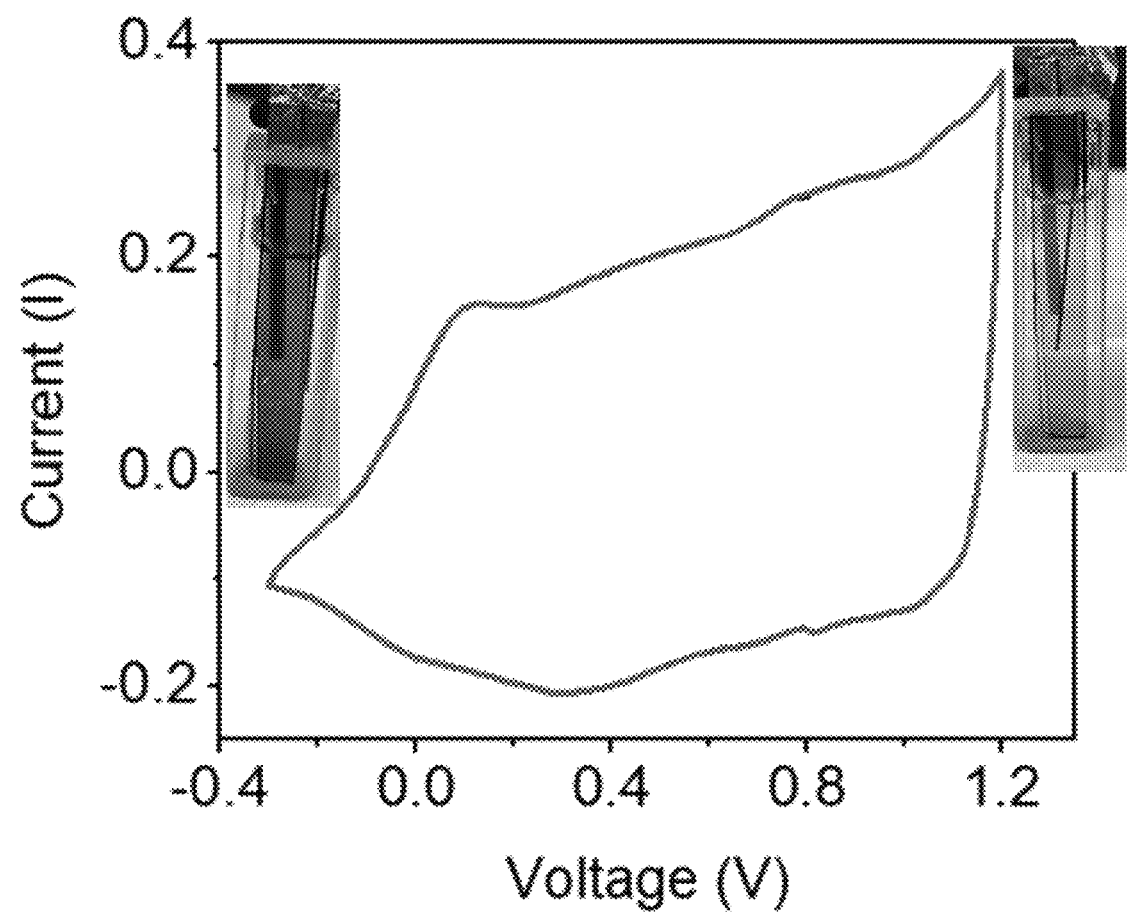
FIG. 4 shows the cyclic voltammogram of an example all-donor black electrochromic polymer thin film. The right insertion is an image of the thin film at bleached state, the left insertion is an image of the thin film at colored state, according to one exemplary embodiment.
Figure 5:
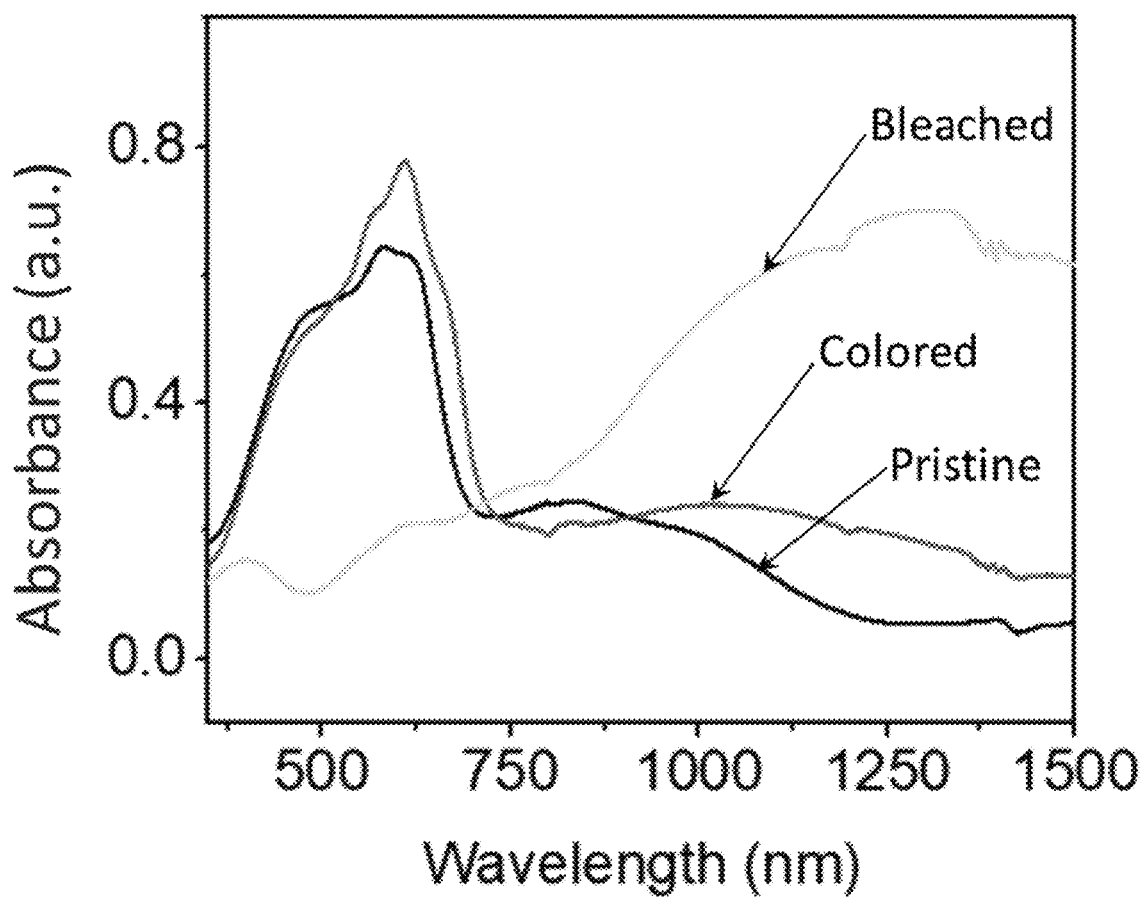
FIG. 5 is the UV-Vis absorption spectra at colored state, bleach state, and pristine state of an example electrochromic polymer, according to one exemplary embodiment.
Figure 6:
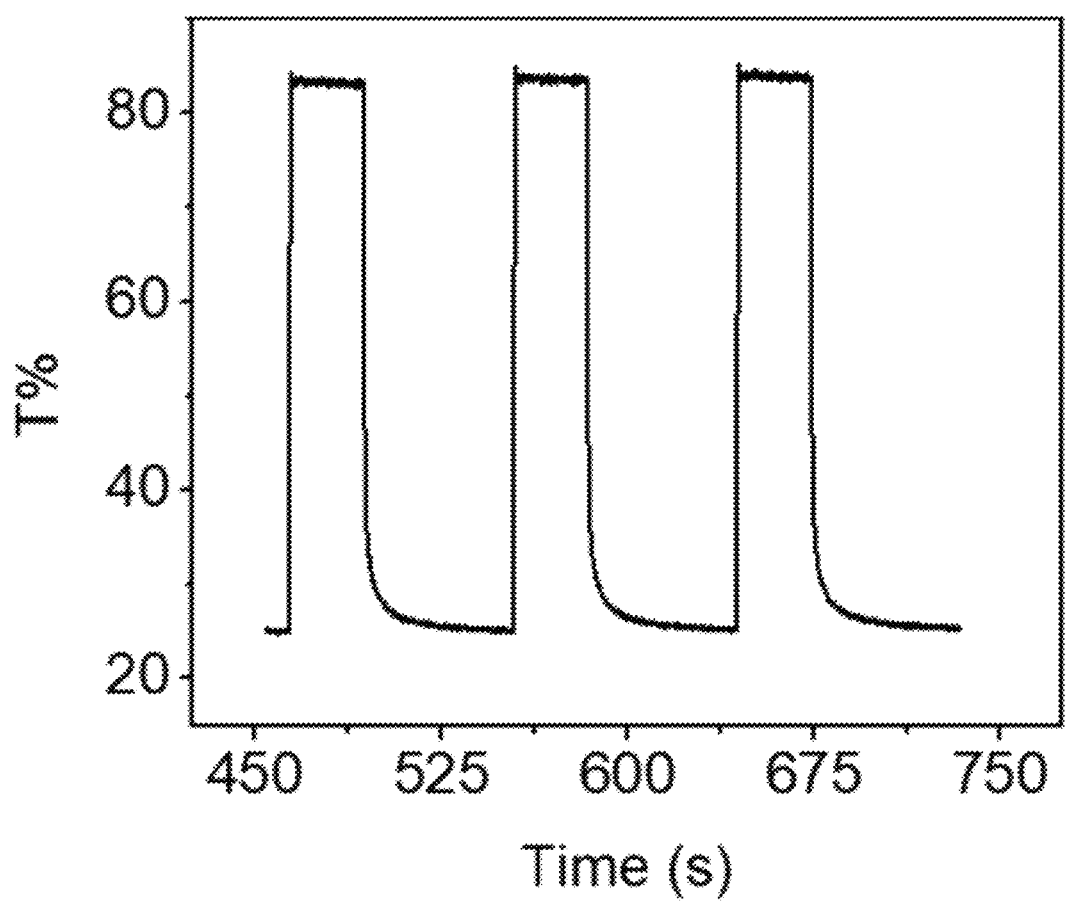
FIG. 6 is a diagram illustrating the switching kinetics of an example all-donor black electrochromic polymer, according to one exemplary embodiment.

The chloroform solution of the example electrochromic polymer with a concentration of 20 mg/ml is used for spin coating of a thin film. 0.1 mL example electrochromic polymer solution is spin-coated onto a 20*30*0.7 mm ITO substrate at the speed of 1500 rpm for 30 seconds. The example electrochromic polymer thin film is tested in a three-electrode configuration as the working electrode, Ag/AgCl as the reference electrode, and Pt wire as the counter electrode. The example electrochromic polymer thin film shows black color at colored state and highly transparent when oxidized at 1.2 V, as shown by the cyclic voltammogram and insertions of the thin film images in FIG. 4. As shown in FIG. 5, the example electrochromic polymer thin film has high absorption at the wavelength from 400 nm to 700 nm when reduced (Colored), while very low absorbance at a similar wavelength when oxidized (Bleached). The example electrochromic polymer thin film maintain a stable switching kinetic with ~60% optical contrast at 609 nm when switching between -0.4 V to 1.2 V, as shown in FIG. 6.

The method to prepare the example electrochromic polymer comprises the following steps 1, 2, and 3:

Step 1: making a Br— end capped all-donor orange polymer

Step 2: making H-end capped all-donor blue polymer

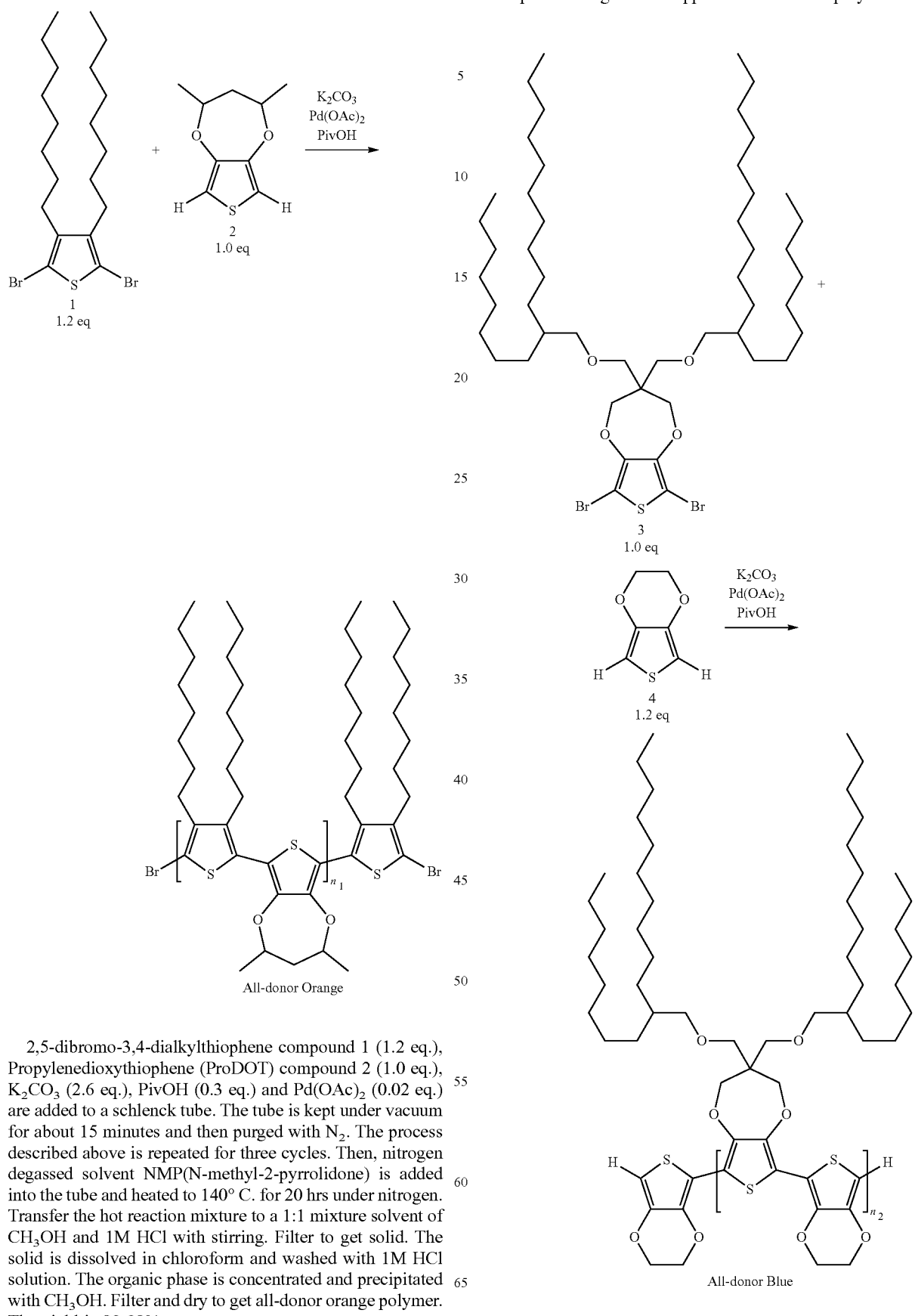

2,5-dibromo-3,4-dialkylthiophene compound 1 (1.2 eq.), Propylenedioxythiophene (ProDOT) compound 2 (1.0 eq.), $K_2CO_3$ (2.6 eq.), PivOH (0.3 eq.) and $Pd(OAc)_2$ (0.02 eq.) are added to a schlenck tube. The tube is kept under vacuum for about 15 minutes and then purged with $N_2$. The process described above is repeated for three cycles. Then, nitrogen degassed solvent NMP(N-methyl-2-pyrrolidone) is added into the tube and heated to 140° C. for 20 hrs under nitrogen. Transfer the hot reaction mixture to a 1:1 mixture solvent of $CH_3OH$ and 1M HCl with stirring. Filter to get solid. The solid is dissolved in chloroform and washed with 1M HCl solution. The organic phase is concentrated and precipitated with $CH_3OH$. Filter and dry to get all-donor orange polymer. The yield is 80-98%.

Dibromo-3,4-propylenedioxythiophene (2Br-ProDOT) compound 3 (1.0 eq.), 2,3-dihydrothieno[3,4-b][1,4]dioxine (EDOT) compound 4 (1.2 eq.), K$_2$CO$_3$ (2.6 eq.), PivOH (0.3 eq.) and Pd(OAc)$_2$ (0.02 eq.) are added to a schlenck tube. The tube is kept under vacuum for about 15 minutes and then purged with N$_2$. The process described above is repeated for three cycles. Then, nitrogen degassed solvent NMP(N-methyl-2-pyrrolidone) is added into the tube and heated to 140° C. for 20 hrs under nitrogen. Transfer the hot reaction mixture to a 1:1 mixture solvent of CH$_3$OH and 1M HCl with stirring. Filter to get solid. The solid is dissolved in chloroform and washed with 1M HCl solution. The organic phase is concentrated and precipitated with CH$_3$OH. Filter and dry to get all-donor blue polymer. The yield is 80-98%

Step 3: making all-donor black polymer.

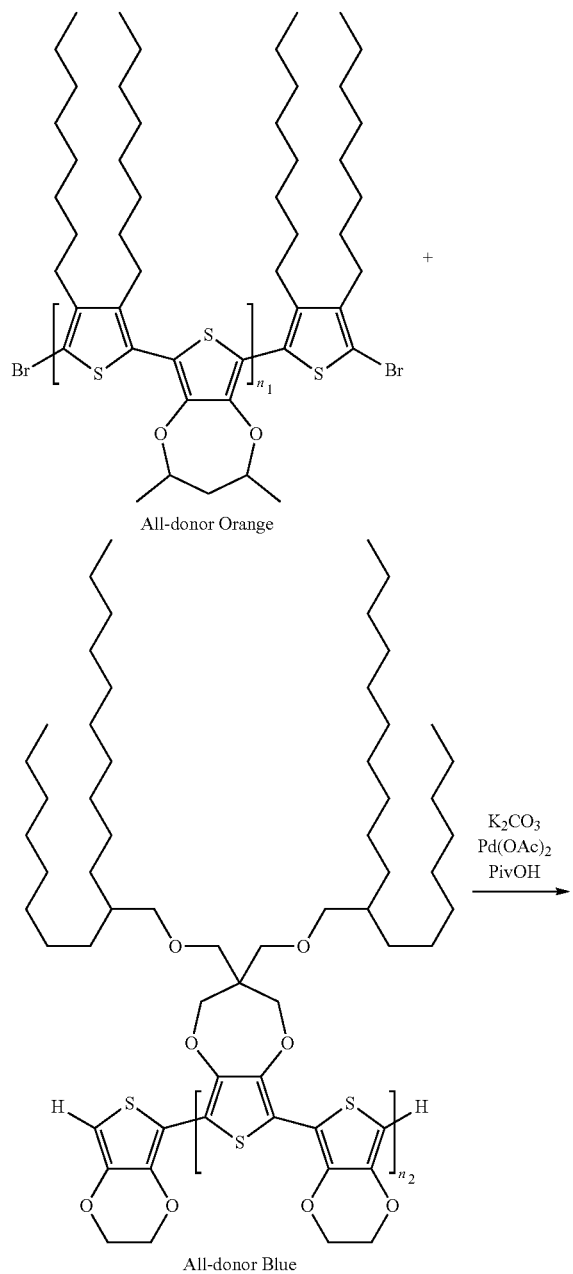

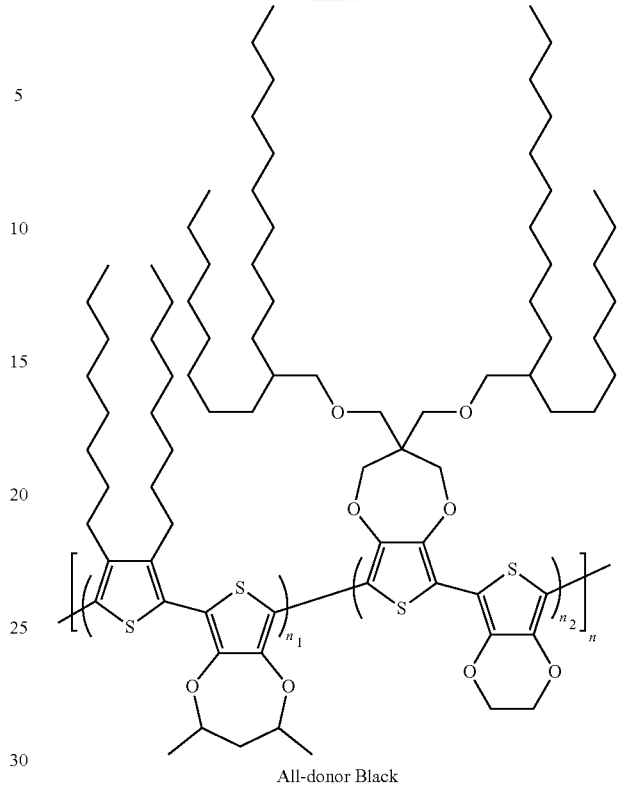

All-donor Black

All-donor orange polymer (0.2 g) obtained in step 1, all-donor blue polymer (0.26 g) obtained in step 2, K$_2$CO$_3$ (2.6 eq.), PivOH (0.3 eq.), and Pd(OAc)$_2$ (0.02 eq.) are added to a schlenck tube. The tube is kept under vacuum for about 15 minutes and then purged with N$_2$. The process described above is repeated for three cycles. Then, nitrogen degassed solvent NMP(N-methyl-2-pyrrolidone) is added into the tube and heated to 140° C. for 20 hrs under nitrogen. Transfer the hot reaction mixture to a 1:1 mixture solvent of CH$_3$OH and 1M HCl with stirring. Filter to get solid. The solid is dissolved in chloroform and washed with 1M HCl solution. The organic phase is concentrated and precipitated with CH$_3$OH. Filter and dry to get black polymer. After polymerization, the decreasing solubility and the transformation of solid-state indicate the successful polymerization between all-donor orange polymer and all-donor blue polymer. The majority of the conjugated polymer has been chemically linked and polymerized into the disclosed electrochromic polymer. There might be some residue conjugated polymers left in the final polymer product in the form of physical blending.

The present disclosure is also related to a method to prepare an electrochromic polymer with combined colors or physical properties from each of the conjugated polymers. The method comprises: preparing each of the conjugated polymers such that each of the conjugated polymers is end capped with reactive functional groups by using at least one reaction monomer; and mixing the conjugated polymers together to form the polymer such that at least a portion of the conjugated polymers are chemically linked. Conjugated polymer are chemically linked together to show combined colors, thus enrich the color library of electrochromic polymer. By combining different colors, different resulting colors, in addition to black color, can be achieved. Electrochromic polymers with different colors can also be obtained by adjusting the ratio between the same set of color combination. In addition, novel electrochromic polymers comprising different properties (thermoplastic, electrical conductivity, ductile, etc.) as well as great electrochromic properties can be achieved.

What is claimed is:

1. An electrochromic polymer comprising at least two conjugated polymers,
wherein,
the electrochromic polymer and the at least two conjugated polymers consist of electron donor groups,
the electrochromic polymer presents a black color at a colored state, and
the electrochromic polymer comprises a formula of

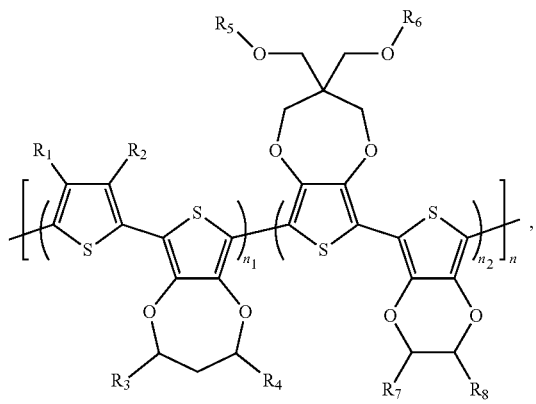

wherein,
each of $R_1$-$R_8$ is independently selected from the group consisting of hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, and $C_3$-$C_{30}$ heteroarylalkyl; and n, $n_1$, and $n_2$ are integers greater than 0.

2. The electrochromic polymer according to claim 1, wherein the electrochromic polymer is produced by chemically linking or physically blending the at least two conjugated polymers or by both chemically linking and physically blending the at least two conjugated polymers.

3. A method to prepare the electrochromic polymer according to claim 1, the method comprising:
preparing each of the conjugated polymers such that each of the conjugated polymers is end capped with reactive functional groups by using at least one reaction monomer; and
mixing the conjugated polymers together to form the electrochromic polymer.

4. An electrochromic polymer comprising at least two conjugated polymers,
wherein,
the electrochromic polymer and the at least two conjugated polymers consist of electron donor groups,
the electrochromic polymer presents a black color at a colored state, and
the electrochromic polymer comprises a formula of

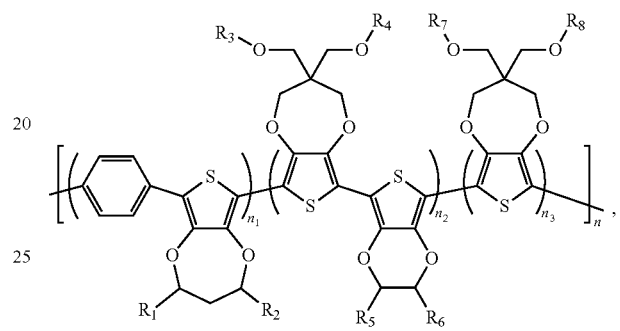

wherein,
each of $R_1$-$R_8$ is independently selected from the group consisting of hydrogen, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$ heterocyclylcarbonyl, $C_3$-$C_{30}$ heterocyclylalkyl, $C_1$-$C_{13}$ heteroaryl, and $C_3$-$C_{30}$ heteroarylalkyl; and n, $n_1$, $n_2$, and $n_3$ are integers greater than 0.

5. A method to prepare the electrochromic polymer according to claim 4, the method comprising:
preparing each of the conjugated polymers such that each of the conjugated polymers is end capped with reactive functional groups by using at least one reaction monomer; and
mixing the conjugated polymers together to form the electrochromic polymer.

6. The electrochromic polymer according to claim 4, wherein the electrochromic polymer is produced by chemically linking or physically blending the at least two conjugated polymers or by both chemically linking and physically blending the at least two conjugated polymers.

* * * * *